(12) United States Patent
Kirchner et al.

(10) Patent No.: US 9,975,393 B2
(45) Date of Patent: May 22, 2018

(54) SELF-PUMPING HYDROPNEUMATIC SUSPENSION STRUT

(71) Applicant: ZF Friedrichshafen AG, Friedrichshafen (DE)

(72) Inventors: Holger Kirchner, Ruppichteroth (DE); Bernhard Russ, Eitorf (DE); Johannes Hampel, Bonn (DE); Wolfgang Prinz, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days. days.

(21) Appl. No.: 15/269,042

(22) Filed: Sep. 19, 2016

(65) Prior Publication Data

US 2017/0080771 A1    Mar. 23, 2017

(30) Foreign Application Priority Data

Sep. 21, 2015 (DE) .......... 10 2015 218 103
Feb. 3, 2016 (DE) .......... 10 2016 201 649

(51) Int. Cl.
*B60G 17/08* (2006.01)
*B60G 15/06* (2006.01)
*B60G 17/044* (2006.01)
*B62K 25/28* (2006.01)
*B62K 25/04* (2006.01)

(52) U.S. Cl.
CPC .......... *B60G 17/08* (2013.01); *B60G 15/062* (2013.01); *B60G 17/044* (2013.01); *B60G 2202/24* (2013.01); *B60G 2202/416* (2013.01); *B60G 2300/12* (2013.01); *B60G 2500/30* (2013.01); *B62K 25/283* (2013.01); *B62K 2025/045* (2013.01)

(58) Field of Classification Search
CPC .... B60G 17/08; B60G 17/044; B60G 15/062; B60G 2202/24; B60G 2300/12; B60G 2202/416; B60G 2500/30; B62K 2025/045; B62K 25/283
See application file for complete search history.

(56) References Cited

U.S. PATENT DOCUMENTS 3,033,556 A * 5/1962 Wossner ................ B60G 15/14
                                                              267/64.19
3,554,524 A * 1/1971 Riehl ..................... B60G 15/00
                                                              188/282.7

(Continued)

FOREIGN PATENT DOCUMENTS

DE       102008032950        2/2012

*Primary Examiner* — Drew J Brown
(74) *Attorney, Agent, or Firm* — Cozen O'Connor

(57) ABSTRACT

A self-pumping hydropneumatic suspension strut includes a high pressure area and a low pressure area, wherein pressurized medium is exchanged between the high pressure area and the low pressure area via a passive pump device. At least two separate channel systems with connection orifices which determine level position and are controlled depending on the position of a piston rod are provided between the high pressure area and the low pressure area. One of the channel systems can be blocked by a valve device, and wherein the suspension strut has a displacing device with a spring seat for a supporting spring. The displacing device is operated via the working movement of the piston rod.

12 Claims, 7 Drawing Sheets

(56) References Cited

U.S. PATENT DOCUMENTS

| | | | | |
|---|---|---|---|---|
| 3,658,313 | A * | 4/1972 | Hahn | B60G 17/0152 267/64.17 |
| 3,837,444 | A * | 9/1974 | Allinquant | B60G 17/044 188/269 |
| 3,904,183 | A * | 9/1975 | Allinquant | F16F 9/08 267/64.17 |
| 6,202,993 | B1 * | 3/2001 | Wilms | B60G 17/044 267/136 |
| 6,474,629 | B2 * | 11/2002 | Beck | F16F 9/064 188/266.3 |
| 6,494,442 | B2 * | 12/2002 | Beck | B60G 15/063 267/64.16 |
| 6,553,761 | B2 * | 4/2003 | Beck | F16F 9/064 280/5.514 |
| 6,871,845 | B2 * | 3/2005 | Beck | F16F 9/08 267/64.17 |
| 7,306,079 | B2 * | 12/2007 | Beck | B60G 17/0408 188/322.19 |
| 7,344,127 | B2 * | 3/2008 | Beck | B60G 17/044 267/64.16 |
| 7,370,849 | B2 * | 5/2008 | Beck | B60G 15/12 188/313 |
| 7,635,051 | B2 * | 12/2009 | Beck | B60G 17/044 188/322.19 |
| 8,052,128 | B2 * | 11/2011 | Kirchner | B60G 17/044 188/313 |
| 8,235,406 | B2 * | 8/2012 | Azekatsu | B60G 17/044 188/315 |
| 8,556,048 | B2 * | 10/2013 | Maeda | B60G 17/08 188/315 |

* cited by examiner

SELF-PUMPING HYDROPNEUMATIC SUSPENSION STRUT

BACKGROUND OF THE INVENTION

1. Field of the Invention

The invention is directed to a self-pumping hydropneumatic suspension strut.

2. Description of the Related Art

A self-pumping hydropneumatic suspension strut which allows two target level positions to be adjusted is known from DE 10 2008 032 950 B3. To this end, the suspension strut has a first channel between a low-pressure space and a high-pressure space with a first connection orifice and a second channel between these two spaces with a second connection orifice. The two connection orifices are spaced apart axially on a longitudinal axis of a pump rod, which determines the height difference between the two level positions.

The level position provided can be determined via a blocking valve. One parameter can be, for example, the vehicle velocity so as to achieve a lowering of the vehicle, e.g., at higher speeds. On the other hand, it can be provided for a utility vehicle, for example, that lowering the level position is useful for loading or unloading. In sports cars, it is sometimes desirable to raise the vehicle body at low speeds.

However, the unit has limitations with respect to design when the suspension strut has a greater distance from the wheel contact point at a vehicle axle. In this case, a transmission ratio must be taken into account when calculating the required spring force. The transmission ratio describes the length of the wheel lever arm relative to the damper lever arm in a vehicle axle. The transmission ratio, which is generally greater than 1, is squared in the equation for calculating spring force and damping force. This mathematical relationship leads to an extreme pressure increase in the high-pressure space when an appreciable transmission ratio occurs. A comparable problem occurs when large piston rod travel is required.

This effect can be overcome very easily with a conventional helical compression spring, but not with a self-pumping hydropneumatic suspension strut.

It is therefore an object of the present invention to further develop the known suspension strut such that it is usable even with a significant transmission ratio and/or long piston rod travel.

SUMMARY OF THE INVENTION

This object is met in that the suspension strut has a spring seat for a supporting spring with a displacing device which is operated via the working movement of the displacer rod.

Some of the bearing load of the suspension strut is taken over by an additional supporting spring whose carrying share can be adjusted through the adjustment of the spring seat. External power for the displacing device can be dispensed with. With the adjustable spring seat for a mechanical supporting spring, the suspension strut can be used without exceeding the compressive load limits even with an unfavorable transmission ratio such as also occurs inter alia in motorcycles at the rear axle.

In a further advantageous embodiment, the displacing device is connected to the high pressure area. Accordingly, a sufficient pressure level is available which is also suitable for larger wheel loads.

For purposes of the freest possible dimensioning of the components operative for the gas spring and for the displacing device, a maximum extended position of the displacing device is limited by a stop. In a further advantageous embodiment, the stop can also be constructed resiliently in order to minimize stop noises on the one hand and to provide a longer spring deflection which becomes operative, e.g., when the working medium expands within the displacing device due to heat and would therefore be subject to a pressure increase, which is now compensated by the resilient stop.

For the same reason, a maximum retracted position is limited by a stop. By limiting the maximum retracted position, the share of the bearing load of the piston rod can be made use of in that the gas spring is more strongly preloaded and, accordingly, the positive natural frequency behavior of the suspension strut remains available. The second stop can also be constructed so as to be resilient in order to prevent a stop noise during an abrupt retracting movement of the annular piston into the annular cylinder of the displacing device.

According to an advantageous embodiment, operating medium is prevented from flowing back out of the displacing device into the high pressure area by a check valve. Pressurized medium is to be prevented from being conveyed from the displacing device back into the high pressure area during a compressive movement or rebound movement of the suspension strut and a simultaneous lowering of the spring seat level. In an embodiment form, the check valve also has an active residual cross section in the blocking position. The residual cross section serves solely to prevent an excessive peak pressure, but not to permit appreciable volume flows. Therefore, the term "blocking position" is meaningful even if a complete blocking function is not wanted.

Further, it is provided in an advantageous manner that the valve device is constructed as a 3/2 directional valve. In principle, it would also be possible to use a blocking valve in the two channel systems in each instance, but this variant affords an advantage with respect to installation space and facilitates the placement of the channel systems in the suspension strut.

The check valve can also be arranged directly in the valve device to simplify the valve device overall.

In order to lower the spring seat as quickly as possible and without external power, a return line of the displacing device is connected to the channel system for the lower level position.

Optionally, it can be provided that the second channel system is outfitted with a check valve which opens in flow direction proceeding from the working chamber distal to the piston rod toward the displacing device and closes in the opposite direction. A check valve of this type always provides for defined flow processes inside the suspension strut, particularly when changes in load, spring travel and switching positions of the valve device for controlling the suspension strut overlap in a complicated manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully with reference to the following figures. The drawings show.

DETAILED DESCRIPTION OF THE PRESENTLY PREFERRED EMBODIMENTS

Figure 1:
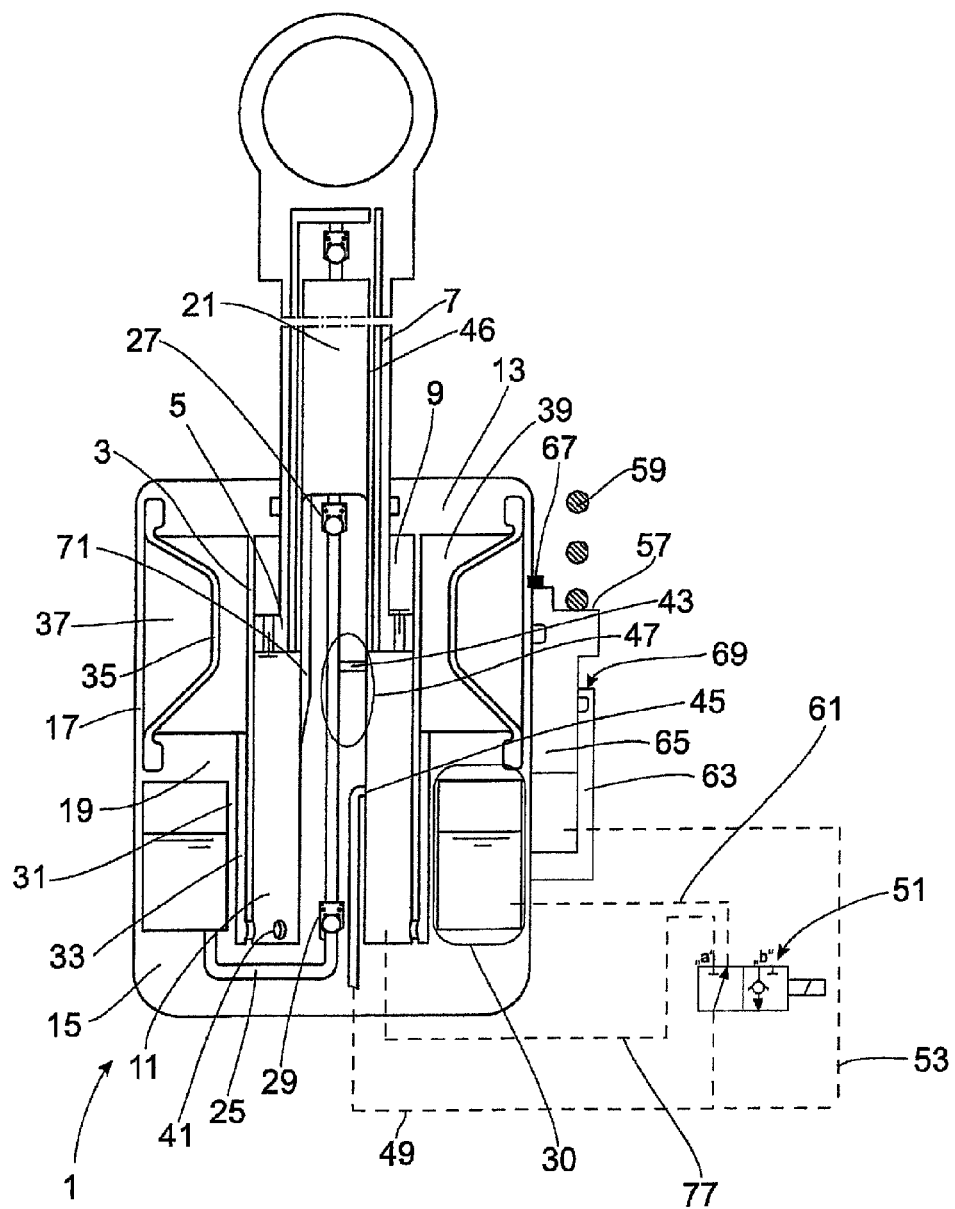
FIGS. 1-5 show a hydropneumatic suspension strut in different level positions.

FIGS. 1 to 4 show a self-pumping hydropneumatic suspension strut 1 in different level positions. The suspension strut 1 comprises a working cylinder 3 which is completely filled with working medium and which is divided by a piston 5 outfitted with damping valves at a piston rod 7 into a working chamber 9 proximal to the piston rod 7 and a working chamber 11 distal to the piston rod 7. The working chamber 9 proximal to the piston rod 7 is terminated by a piston rod guide 13. A base 15 limits the working chamber 11 distal to the piston rod 7.

The working cylinder 3 is enclosed by a receptacle 17, and an annular space which is divided in two axially by an annular disk 19 is between the working cylinder 3 and the receptacle 17.

The piston rod 7 is constructed with a hollow chamber 21 which is open in direction of the base 15 and into which a pump rod 23 fixed to the base 15 extends also at the maximum extended position of the piston rod 7. The piston rod 7 and the pump rod 23 form a pump device, and the hollow chamber 21, the pump space and the pump rod 23 form a pump piston.

The pump space 21 is connected to a low pressure area 30 via a suction line 25 having two check valves 27; 29. The low pressure area 30 is filled with gas-preloaded working medium and extends between the outer annular region of the base 15 and the annular disk 19. In direction of the working cylinder 3, a dividing cylinder 31 is clamped between the base 15 and the annular disk 19 so that an annular channel 33 is formed between the base 15 and an annular chamber region above the annular disk 19. A diaphragm sleeve 35, for example, which forms a gas-filled pressure space 37 with the receptacle 17 is fixed in this annular chamber region. An inner annular chamber region 39 is completely filled with working medium and forms a compensation chamber for the piston rod. In principle, the pressure space 37 could also be preloaded via alternative means, e.g., via a gas bag such as is known from DE 198 35 222 A1.

A plurality of connection orifices 41 are constructed in the working cylinder 3 near the base between the work chamber 11 distal to the piston rod 7 and the annular channel 33 so that the volume can be displaced from the working chamber 11 distal to the piston rod 7 into the inner annular chamber area 39. The working chamber 9 proximal to the piston rod and the working chamber 11 distal to the piston rod 7, the annular channel 33 and the inner annular chamber area 39 form a high pressure area.

The pump rod 23 has two axially spaced connection orifices 43; 45 which can be covered depending on stroke by a control sleeve 46 as part of the piston rod 7. A first, upper connection orifice 43 is connected to the channel system of the suction line 25 for the low pressure area 30 and defines an upper construction position which is to be maintained during variable loading. The first connection orifice and the suction line form a first channel system 47.

A second, lower connection orifice 45 stands for a second construction position which is likewise to be occupied during variable loading. This connection orifice 45 also connects the working chamber 11 distal to the piston rod 7 to the low pressure area 30 via a second channel system 49, 61. A valve device 51 with switching positions "a" and "b" is arranged in the second channel system 49, and the second channel system 49, 61 can be optionally connected to or disconnected from the low pressure area 30 via these switching positions "a" and "b".

Hydraulically parallel to the valve device 51 is a third channel 53 to a displacing device 55 which comprises an axially adjustable spring seat 57 for a supporting spring 59. The third channel 53 is connected to the second channel system 49. The third channel 53 experiences flow in two directions during the adjusting operation proceeding from the work chamber 11 in order to lift the spring seat 57 and for the return flow from the displacing device 55 through the valve device 51 into the low pressure area 30. A fourth channel 61 forms a return line from the valve device 51 to the low pressure area 30. This channel is dependent on the switching position of the valve device 51 which is constructed as a 3/2 directional valve.

A return flow via the fourth channel 61 is not possible because the high pressure area always has at least the same pressure as the low pressure area.

A fifth channel 77 connects the working chamber 11 distal to the piston rod 7 to the valve device 51. As a result of a check valve function in the valve device 51, the fifth channel 77 can experience flow only on one side from the working chamber 11 distal to the piston rod 7 to the displacing device 55.

When the suspension strut is located in the position shown in FIG. 1, i.e., the connection orifice 43 is open, the low pressure area 30 and the high pressure area, working chamber 11 distal to the piston rod 7 and annular chamber 39 are interconnected via the suction line 25. If the position of the piston rod were fixed, the pressure level of the low pressure area 30 and high pressure area could converge. In practice, this state occurs only dynamically (temporarily) or precisely statically during unloading/unloading of the suspension strut.

When the connection between the two pressure areas is open, the carrying force on the piston rod cross section also decreases due to the decrease in pressure in the high pressure area. Consequently, the piston rod retracts and, in doing so, closes the connection orifice 43. Then there is again a pressure difference between the low pressure area and the high pressure area which is further increased during a retracting or compression movement.

The displacing device 55 comprises an annular cylinder 63 which is fixed to the outer receptacle 17. An annular piston 65 is guided in the annular cylinder 63 so as to be axially displaceable and sealed. An upper cover surface of the annular piston forms the spring seat 57 for the supporting spring 59.

A first stop 67 proximal to the receptacle determines a maximum extended position of the spring seat 57 or annular piston 65. A second stop 69 which is formed, e.g., by an end face of the annular cylinder 63 limits a maximum retracted position of the annular piston 65 in the annular cylinder 63. The maximum retracted position can also be limited in the annular cylinder by corresponding measures.

In the unloaded condition of a vehicle, the supporting spring 59 has a carrying share that is appreciably greater than the carrying share of the piston rod with the gas spring in the high pressure area. The smaller carrying share of the gas spring on the piston rod results solely because of the appreciably smaller supporting surface or cross-sectional area of the piston rod 7 compared to the pressure-impinged surface of the annular piston 65 of the displacing device 55. In the position according to FIG. 1 in which the piston rod 7 is located above an upper level position, the ratio of the carrying force of the piston rod 7 to the supporting spring 59 can certainly be 1:5, i.e., the carrying force of the supporting spring 59 is five times greater than the carrying force of the piston rod 7 in connection with the pressure in the pressure space 37.

In this piston rod position, regardless of the switching position of the valve device 51, working medium flows back via the first connection orifice 43 into the suction channel 25 and further past the check valve 29, which does not completely close, into the low pressure area 30. If the piston 5 remains above the first connection orifice 43 after the retracting movement, no pumping function is exerted because the pump space 21 communicates with the high pressure area via a bypass groove 71.

In parallel with this, the annular cylinder 63 of the displacing device 55 is supplied with working medium via the second channel system 49 and in a switching position "b" of the valve device via the fifth channel 77. Owing to the dimensioning of the piston rod cross section in relation to the annular piston cross section, the displacing device 55 is preferably filled with working medium. Therefore, the spring seat 57 is always located at the first stop 67 during a lift movement of the piston 5 above the first connection orifice 43.

Figure 2:
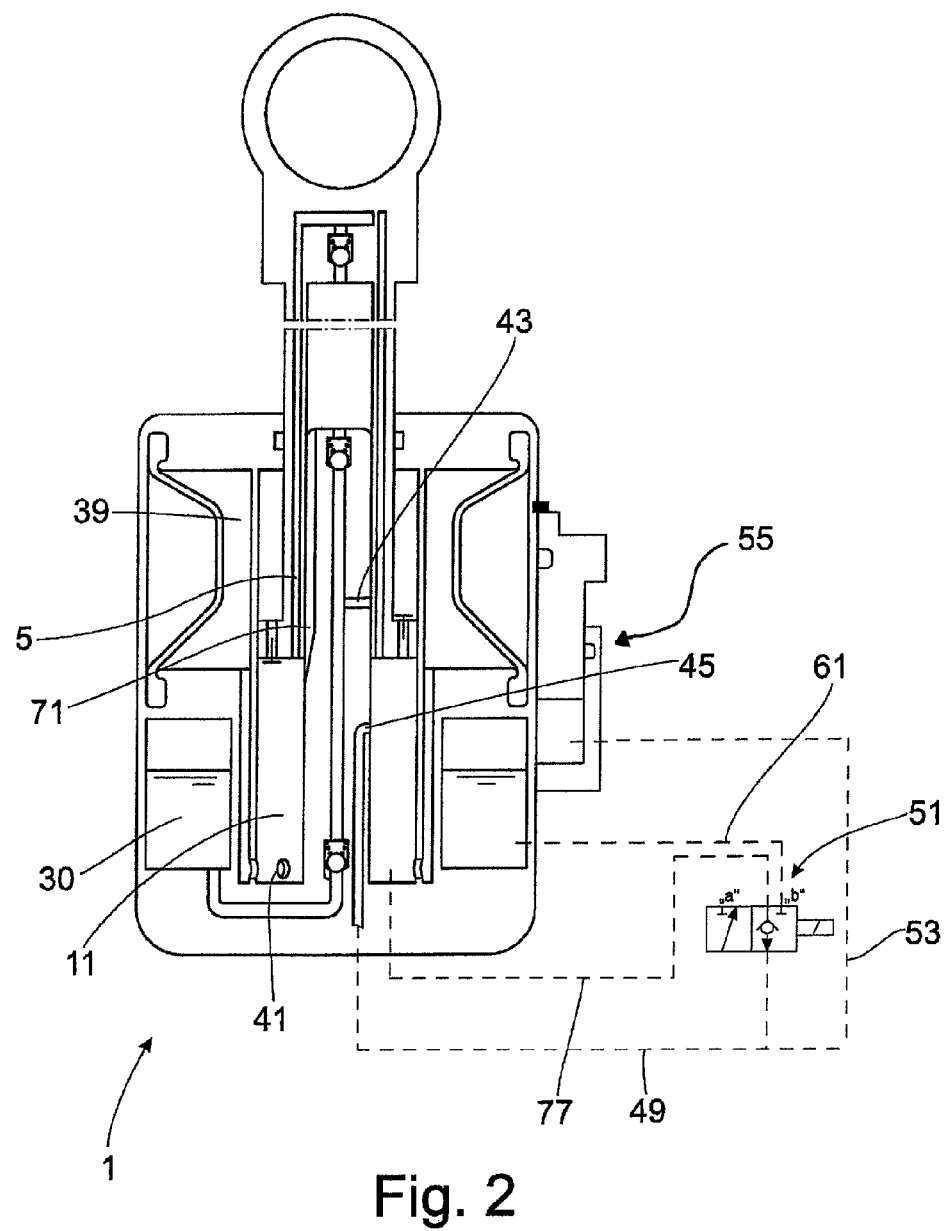

FIG. 2 shows the identical suspension strut 1 according to FIG. 1 in a lift position of the piston 5 between the two connection orifices 43; 45. The valve device 51 is in the "b" switching position. The pump device conveys working medium from the low pressure area 30 into the high pressure area 11; 39 and lifts the piston rod 7 again until the bypass groove 71 is open again. The pressure difference between the high pressure area 11; 39 and the annular cylinder 63 provides for an extension movement of the spring seat 57. Working medium is conveyed directly via the second channel system 49 and via the fifth channel 77, 53 into the displacing device 55.

Figure 3:
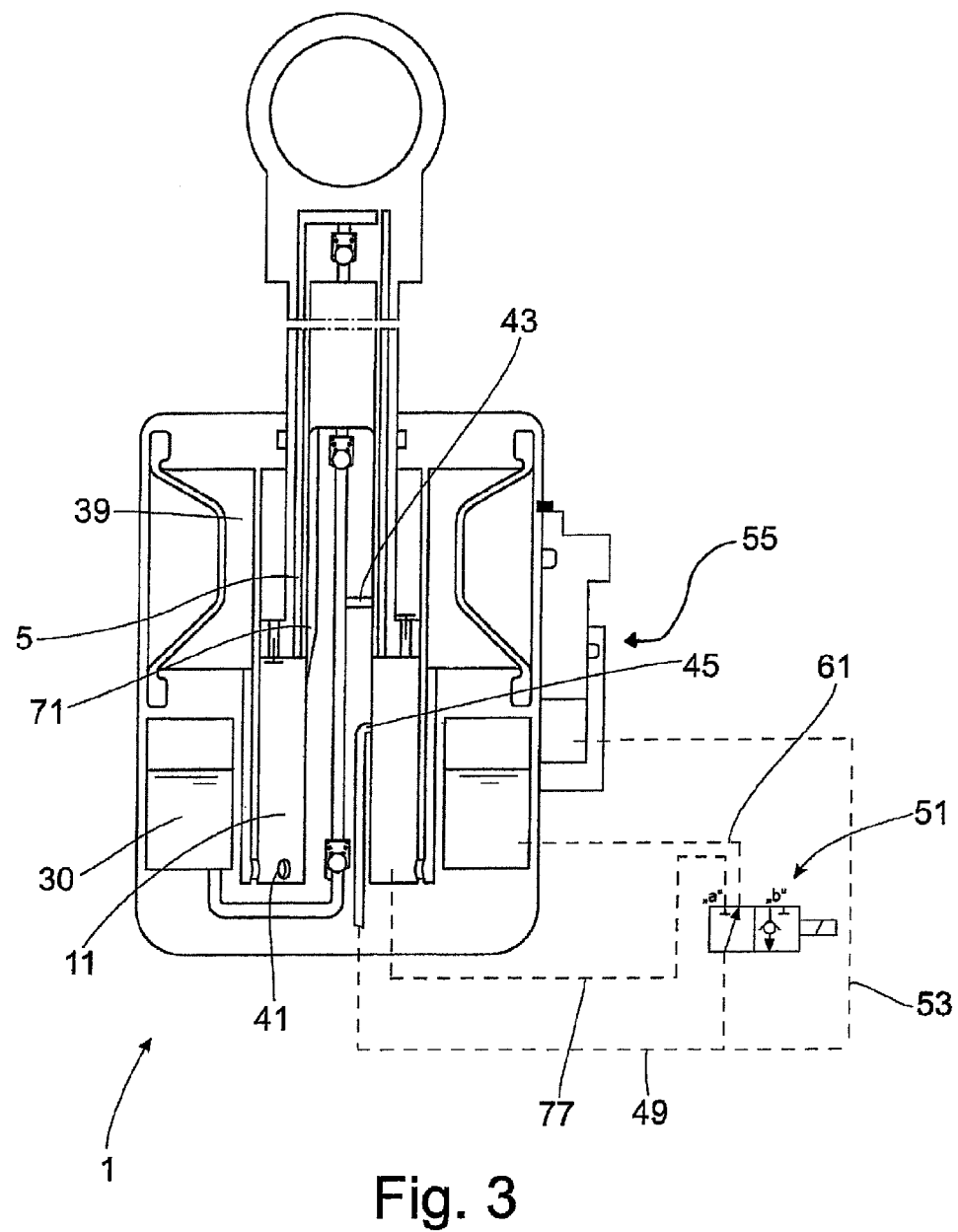

The valve device 51 is located in the same identical piston rod positions as in FIG. 2 for the further description referring to FIG. 3 in switching position "a". The high pressure area 11; 39 and the low pressure area 30 are now connected with one another via the second channel system 49 and the fourth channel 61. On the one hand, the working chamber 11 distal to the piston rod 7 is connected to the second connection orifice 45 via the second channel system 49 at the low pressure area 30 and is connected to the high pressure area 39 via the connection orifices 41 near the base. There is a pressure decrease in the high pressure area relative to the low pressure area 30. Accordingly, the piston rod 7 drops in until the piston rod has reached the second connection orifice 45. If the second connection orifice 45 is covered, the connection between the high pressure area and the low pressure area is blocked and there is no further drop in pressure. However, oil continues to flow out of the valve device via channels 53, 61 back into the low pressure area 30 until the annular dividing piston 65 has reached its second stop 69. Accordingly, depending on loading, a pressure difference can occur between the high pressure area 11, 39 and the low pressure area 30. Accordingly, the second connection orifice 45 determines the second, lower level position. Consequently, it is possible to change between the two level positions arbitrarily by means of the valve device 51 determined by the positions of the connection orifices 43; 45.

During a compression movement of the piston rod 7, working medium is conveyed via the opened second connection orifice 45 and the opened 3/2 directional valve 51 according to switching position "a" on the one hand into the low pressure area 30 and further into the displacing device 55. Although the pump device 7; 21; 23 does carry out a pump function during an extension movement, the pump volume is conveyed again right away into the low pressure area 30 because the low pressure area 30 and the high pressure area 11; 39 are connected to one another via the second channel system 49.

Figure 4:
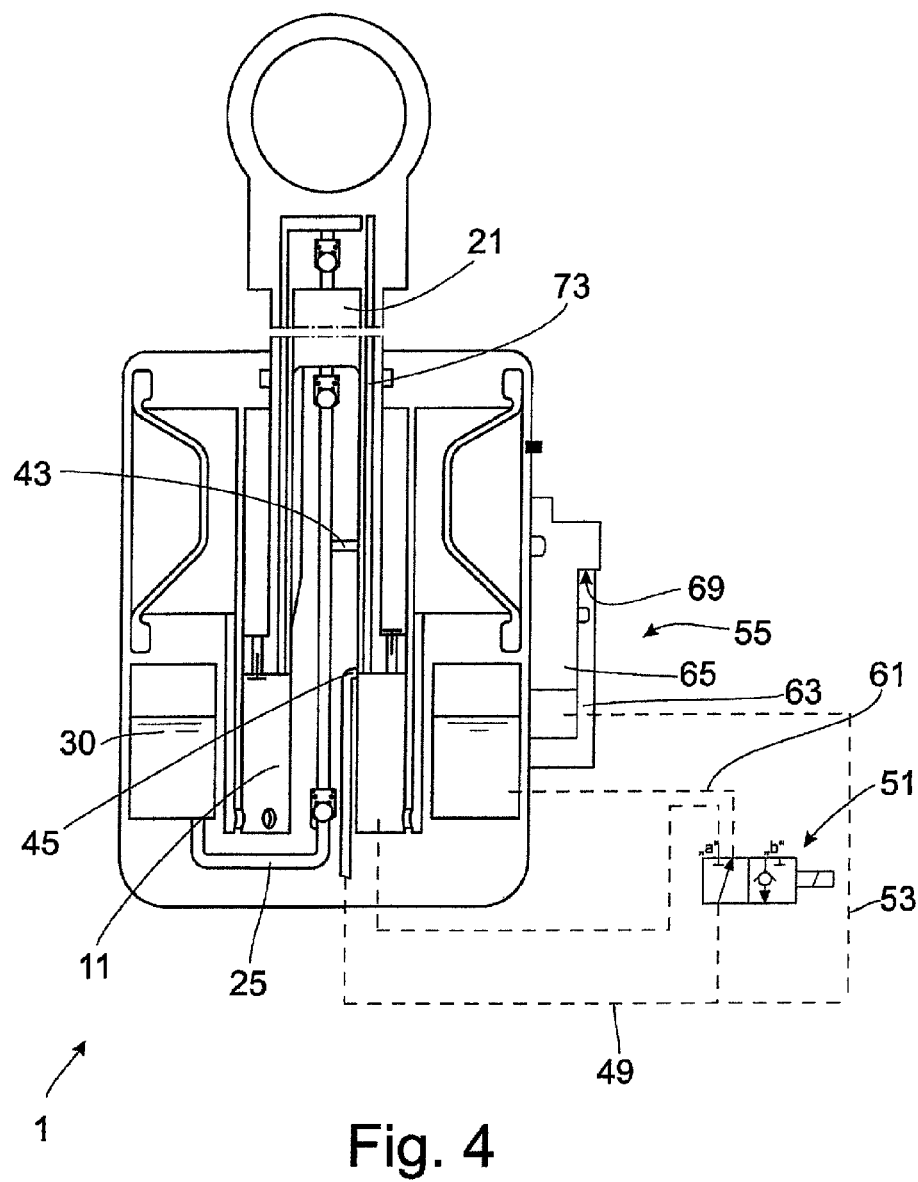

FIG. 4 shows the suspension strut 1 in its second, lower level position in connection with the valve device 51 in switching position "a". During every compression movement, the annular piston 65 of the displacing device 55 in the annular cylinder 63 is always impinged by flow as long as the second connection orifice 45 and, accordingly, the second channel system 49 are open. The working medium can be conveyed into the displacing device 55 via the third channel 53. If the second connection orifice 45 is closed by the piston rod position in connection with switching position "a", the displacing device 55 is no longer supplied with working medium. A return flow from the displacing device 55 into the working chamber 11 distal to the piston rod 7 cannot take place because the second connection orifice 45 would also be permanently closed during a compression movement beyond the second connection orifice 45 in direction of the base 15. However, working medium could escape into the low pressure area 30 from the displacing device 55 via the third channel 53 and through the valve device 51 and the fourth channel 61, since the supporting spring 59 is also more strongly preloaded during a compression movement and the preloading is transmitted via the annular piston 65 to the pressurized medium which therefore causes the pressure compensation with the low pressure area 30. A return flow from the displacing device 55 into the working chamber 11 distal to the piston rod 7 is blocked in switching position "a".

The pump function of the pump device remains available so that working medium can be conveyed from the low pressure area 30 via the suction line 25 and pump space 21 and a filling line 73 in the piston rod 7 into the working chamber 11 distal to the piston rod 7 until the second connection orifice 45 is again open.

With further loading of the suspension strut, the proportion of the spring constant of the gas spring 37 for the carrying force of the piston rod 7 increases in relation to the supporting spring 59 because the pressure in the high pressure area increases, but the pressure in the annular cylinder 63 does not increase because the annular cylinder can be supplied with working medium neither via the second channel 49 nor via the fifth channel 77. Accordingly, the natural frequency of the suspension strut can be kept constant.

Figure 5:
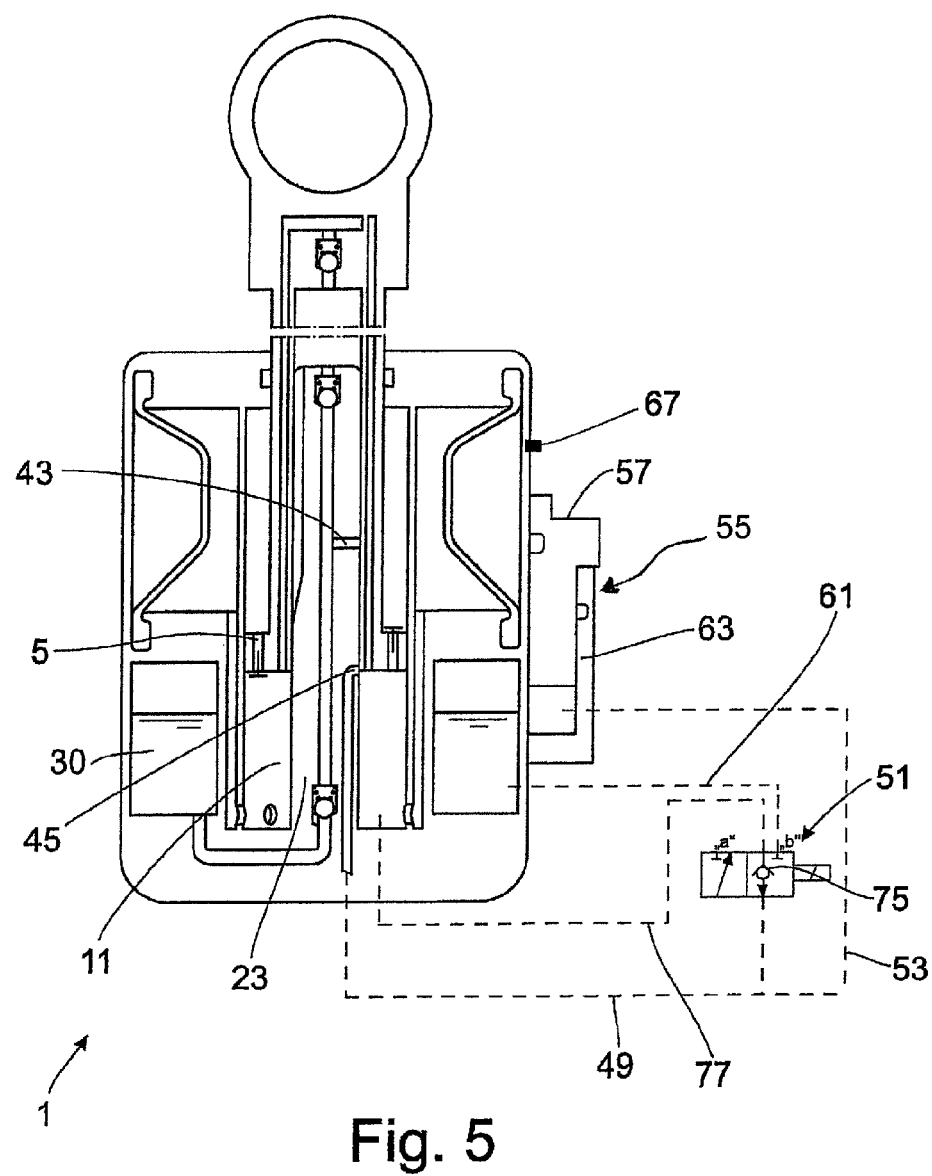

FIG. 5 shows the suspension strut 1 in the level position according to FIG. 3, but with the valve device 51 in switching position "b" in which the connection between the working chamber 11 distal to the piston rod 7 and the low pressure area 30 is closed via the second channel system 49. In the opposite flow direction, no working medium can be conveyed again from the annular cylinder 63 via the second channel system 49 into the working chamber 11 distal to the piston rod 7 as long as the piston 5 is located below the second connection orifice 45.

During a compression movement, pressurized medium is conveyed from the working chamber 11 distal to the piston rod 7 through the fifth channel 77 via the valve device 51 into the displacing device 55. In parallel with this, however, a pump function is carried out in which working medium is conveyed from the low pressure area 30 into the high pressure area. The pump function is always operative in the lift range of the piston rod 7 between the second connection orifice 45 and the base 15.

During an extension movement of the piston rod 7, no working medium can flow back out of the displacing device 55 into the low pressure area 30 or into the high pressure area. The return flow via the second channel system 49 is blocked as long as the second connection orifice 45 is covered and the return flow via the fifth channel 77 is impeded through a check valve function inside the valve device 51. Also, a return flow into the low pressure area 30 is impossible. Accordingly, the displacing device 55 is hydraulically blocked in the retraction direction.

Figure 6:
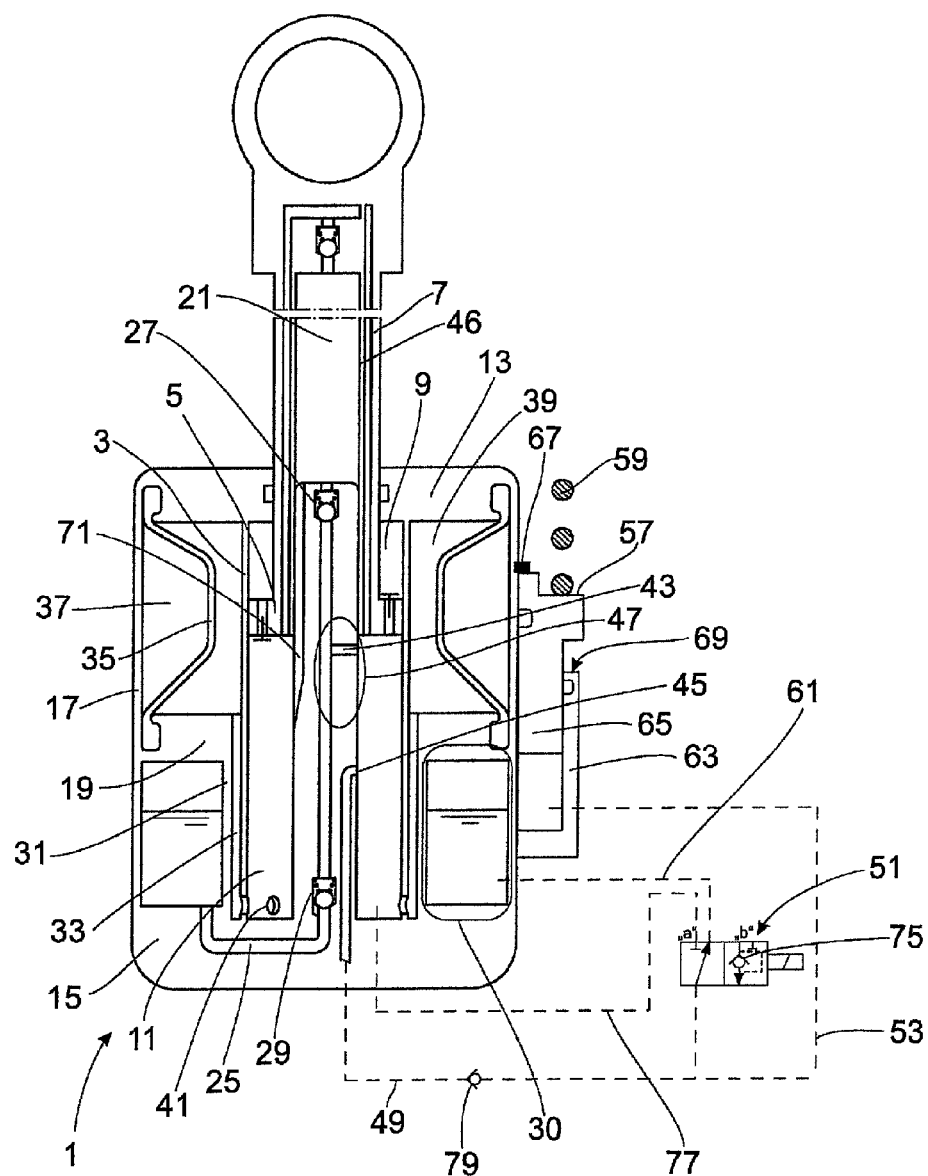
FIG. 6 is a suspension strut according to FIG. 1 with additional check valve in the channel system.

FIG. 6 shows a modification of the suspension strut 1 according to FIG. 1. In principle, the volume flows inside the suspension strut 1 are determined by loading, the valve position of the valve device 51 and the rebound/compression movements of the piston rod 7.

Simple basic principles of the suspension strut 1 are, e.g., that the spring seat 57 contacts the first stop 67 in switching position "b" of the valve device 51 and contacts the second stop 69 in switching position "a", since the displacing device 55 is then connected to the low pressure area 30.

Owing to the pressure ratios in the high pressure area and in the displacing device 55, it should be ensured that no working medium can flow back into the high pressure area from the displacing device 55 in switching position "b" of the valve device 51. This question is relevant particularly when the piston rod is located between the two connection orifices 43; 45.

However, it may happen that the loading of the suspension strut 1 changes, in particular decreases, at the same time that a rebound movement takes place and the switching position of the valve device 51 possibly changes as well. This could result in volume flows which are difficult to determine. In order always to be able to direct the volume flows in a specific manner, the second channel system 49 has a check valve 79 which opens in flow direction from the working chamber 11 distal to the piston rod 7 in direction of the displacing device 55 and closes in the opposite direction. There is then a compulsorily fixed relationship between the switching positions of the valve device 51 and the displacing device 55. Consequently, working medium can under no circumstances flow from the displacing device 55 back into the working chamber 11 distal to the piston rod 7 in switching position "b" of the valve device 51.

If the piston rod 7 were located below the second connection orifice 45 and the valve device 51 were in switching position "b", the displacing device 55 occupies the maximum extended position at the first stop 67. Accordingly, the working medium volume is enclosed within the second channel system 49, third channel 53 and annular cylinder 63. A temperature increase during the operation of the suspension strut 1 would lead to an appreciable pressure increase within this working medium volume.

One possibility for overcoming the problem of the pressure increase would be, e.g., to configure the first stop 67 such that the normal peak loads are absorbed and the first stop 67 occupies its appropriate extended position. For example, when the stop 67 is supported by a spring or is itself formed of an elastic material, then loads going beyond this could also be compensated in that the annular piston 65 extends somewhat farther and, in doing so, makes use of the elasticity of the stop 67.

Alternatively, it can also be provided that the check valve 75 does not close hermetically, but leaves open a small residual cross section 81 also in the closed position which provides for compensation, e.g., of a thermally induced peak load.

A further variant could consist, e.g., in that the check valve 75 is controlled by the input pressure into the channel systems 49; 53 and during a peak load the check valve 75 is somewhat open and accordingly releases the fifth channel 77 via a small residual cross section to the working chamber 11 distal to the piston rod 7 which is connected in turn to the annular chamber area 39 and, therefore, to the elastic pressure space 37.

Figure 7:
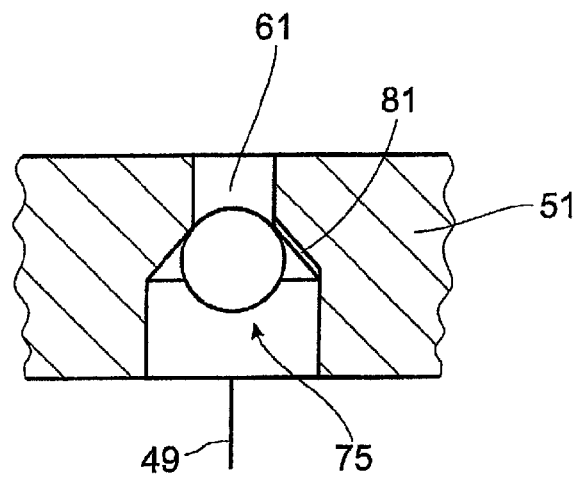
FIG. 7 is a detailed view of the valve device according to FIGS. 1 to 6.

For purposes of clearer comprehension, FIG. 7 shows a section of the valve device 51 with a check valve 75 without pressure control in which there is a permanently open residual cross section 75.

Figure 8:
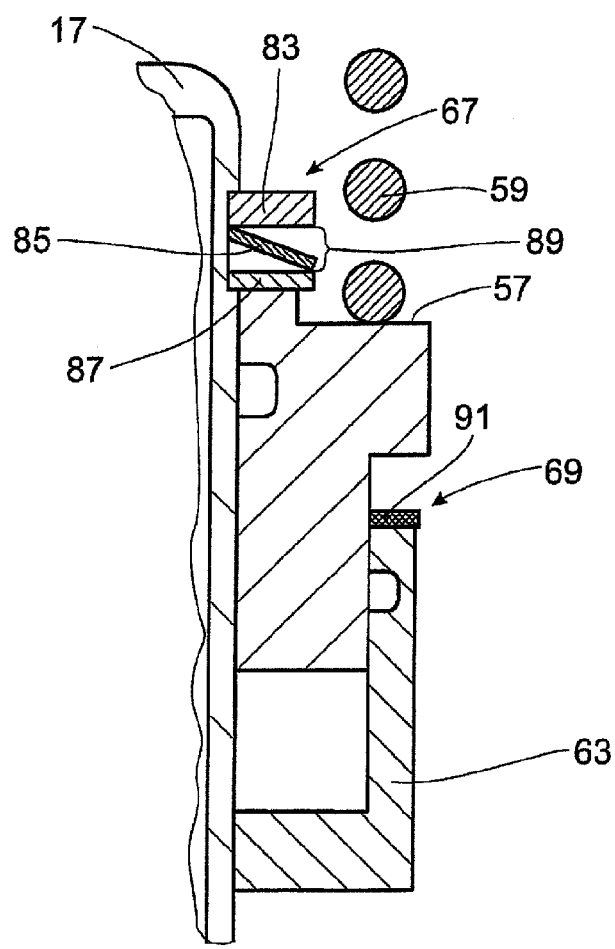
FIG. 8 is a detailed view of stops according to FIGS. 1 to 6.

FIG. 8 is limited to an enlarged half-section through the displacing device 55. This embodiment form of the displacing device 55 has a first resilient stop 67 which comprises, for example, a fixed stop in the form of a rigid ring 83 and, supported at the latter, a spring 85 with a stop disk 87. The spring seat 57 contacts the stop disk 87 in switching position "b" of the valve device in normal operation. Spring 85 additionally has a residual travel 89. This residual travel 89 can serve for compensating a thermally induced thermal expansion of the working medium enclosed in the displacing device 55. A further positive effect consists in that there is no stop noise during a sudden movement of the annular piston when striking the first stop 67.

The second stop 69 can also advantageously have an elasticity 91, e.g., in the constructional form of an elastomer ring, in order to prevent a stop noise of the annular piston 65 on the annular cylinder 63.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A self-pumping hydropneumatic suspension strut (1) comprising:
    a high pressure area (11; 39);

a low pressure area (30);

a piston rod (7);

a pump device (21; 23) for exchanging pressurized medium between said high pressure area (11; 39) and said low pressure area (30);

at least two separate channel systems (47; 49) between said high pressure area (11; 39) and said low pressure area (30), said at least two channel systems comprising level position determining connection orifices (43; 45) which are controlled depending on the position of a said piston rod (7);

a valve device (51) for blocking one of said at least two channel systems (49);

a displacing device (55) comprising a spring seat (57) for a supporting spring (59); said displacing device (55) operated by a working movement of said piston rod (7);

said displacing device (55) connected to said high pressure area (11; 39) by a fluid connection (49; 53).

2. The suspension strut according to claim 1, additionally comprising a first stop (67) for limiting a maximum extended position of said displacing device (55).

3. The suspension strut according to claim 2, wherein said first stop (67) is constructed to be resilient.

4. The suspension strut according to claim 2, additionally comprising a second stop (69) for limiting a maximum retracted position of said displacement device (55).

5. The suspension strut according to claim 4, wherein said second stop (69) is constructed to be resilient.

6. The suspension strut according to claim 1, additionally comprising a first check valve (75) for blocking a return flow of working medium from said displacing device (55) into said high pressure area (11; 39).

7. The suspension strut according to claim 6, wherein said first check valve (75) comprises a residual cross section (81) that is active in the blocking position.

8. The suspension strut according to claim 6, wherein said check valve (75) is arranged in said valve device (51).

9. The suspension strut according to claim 1, wherein said valve device (51) is constructed as a 3/2 directional valve.

10. The suspension strut according to claim 1, wherein said displacing device (55) comprising a return line (53) connected to one of said at least two separate channel systems (49) for a lower level position.

11. The suspension strut according to claim 1, additionally comprising a second check valve (79) in one of said at least two separate channel systems (49) which opens in a flow direction proceeding from a working chamber (11) distal to said piston rod toward said displacing device (55) and closes in the opposite direction.

12. The suspension strut according to claim 1, additionally comprising an outer receptacle (17); and wherein said displacing device (55) comprises an annular cylinder (63) fixed to said outer receptacle (17); and further comprising an annular piston (65) having an upper cover surface and guided in said annular cylinder (63) so ash to be axially displaceable and sealed; said upper cover surface of said annular piston forming said spring seat (57) for said supporting spring (59).

\* \* \* \* \*